US012561815B2

(12) United States Patent
Yang et al.

(10) Patent No.: US 12,561,815 B2
(45) Date of Patent: Feb. 24, 2026

(54) METHOD OF DETECTING OBJECT IN VIDEO AND VIDEO ANALYSIS TERMINAL

(71) Applicant: SEOUL NATIONAL UNIVERSITY R&DB FOUNDATION, Seoul (KR)

(72) Inventors: Kichang Yang, Seoul (KR); Youngki Lee, Seoul (KR); Juheon Yi, Seoul (KR); Kyungjin Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 333 days.

(21) Appl. No.: 18/310,216

(22) Filed: May 1, 2023

(65) Prior Publication Data

US 2023/0351613 A1 Nov. 2, 2023

(30) Foreign Application Priority Data

May 2, 2022 (KR) ......................... 10-2022-0054394

(51) Int. Cl.
*G06T 7/20* (2017.01)
*G06V 10/25* (2022.01)
(Continued)

(52) U.S. Cl.
CPC ................ *G06T 7/20* (2013.01); *G06V 10/25* (2022.01); *G06V 10/44* (2022.01); *G06V 10/762* (2022.01);
(Continued)

(58) Field of Classification Search
CPC . G06T 7/20; G06T 2207/10016; G06T 7/246; G06T 2207/30261; G06T 7/11; G06T 7/292; G06T 2207/30232; G06T 2207/30241; G06T 2207/30196; G06T 2207/30236; G06T 2207/10024; G06T 2207/30252; G06T 2207/20012; G06T 7/248; G06T 7/70; G06T 2207/30201; G06T 3/12; G06T 7/215; G06T 2207/10021; G06T 2207/10028; G06T 2207/30204; G06T 7/00; G06T 7/74;
(Continued)

(56) References Cited

U.S. PATENT DOCUMENTS 7,130,446 B2 10/2006 Rui et al.
11,076,589 B1 * 8/2021 Sibley ................. A01M 7/0014
(Continued)

FOREIGN PATENT DOCUMENTS

JP 2002-236929 A 8/2002
KR 10-2003-0045624 A 6/2003
(Continued)

OTHER PUBLICATIONS

Office Action issued Feb. 27, 2025 in Korean Patent Application No. 10-2022-0054394.

*Primary Examiner* — Alex Kok S Liew
(74) *Attorney, Agent, or Firm* — Sughrue Mion, PLLC

(57) ABSTRACT

Provided is a video analysis terminal including a patch recommendation unit configured to recommend tracking-failure patches and new-object patches in a current frame of a video image, and a patch aggregation unit configured to generate a first patch cluster by collecting the tracking-failure patches recommended in the current frame, and generate a second patch cluster by collecting the new-object patches recommended in the current frame.

14 Claims, 5 Drawing Sheets

(51) Int. Cl.
     *G06V 10/44*        (2022.01)
     *G06V 10/762*      (2022.01)
     *G06V 10/764*      (2022.01)

(52) U.S. Cl.
     CPC ........ *G06V 10/764* (2022.01); *G06V 2201/07*
                                             (2022.01)

(58) Field of Classification Search
     CPC .... G06T 2200/04; G06V 20/58; G06V 10/25;
                 G06V 10/62; G06V 20/10; G06V 20/56;
                     G06V 20/52; G06V 10/235; G06V
                       10/255; G06V 10/451; G06V 10/46;
                G06V 10/56; G06V 20/00; G06V 40/10;
                           G06V 10/24; G06V 10/945
     See application file for complete search history.

(56)                     References Cited

U.S. PATENT DOCUMENTS

| | | | |
|---|---|---|---|
| 2003/0235327 A1* | 12/2003 | Srinivasa ............. | G06V 10/255 |
| | | | 382/104 |
| 2012/0093368 A1 | 4/2012 | Choi et al. | |
| 2017/0256057 A1 | 9/2017 | Bak et al. | |
| 2018/0082428 A1* | 3/2018 | Leung ................... | G06V 10/25 |
| 2019/0050994 A1* | 2/2019 | Fukagai ................. | G06F 18/24 |

FOREIGN PATENT DOCUMENTS

| | | |
|---|---|---|
| KR | 10-0970119 B1 | 7/2010 |
| KR | 10-2015-0033047 A | 4/2015 |
| KR | 10-2019-0048208 A | 5/2019 |

* cited by examiner

Figure 2:
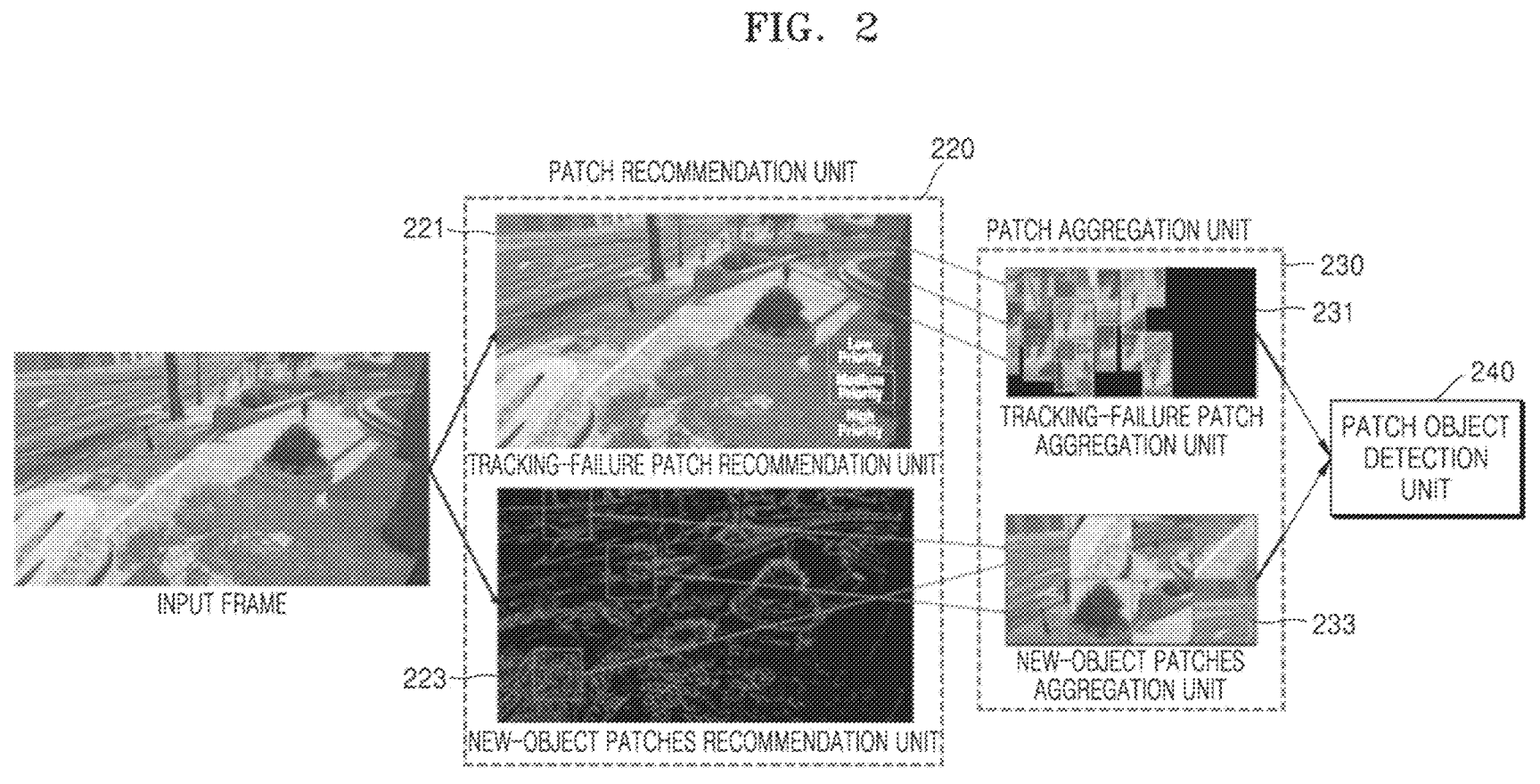

PATCH OBJECT DETECTION UNIT

230

231

PATCH AGGREGATION UNIT

TRACKING-FAILURE PATCH AGGREGATION UNIT

233

NEW-OBJECT PATCHES AGGREGATION UNIT

220

PATCH RECOMMENDATION UNIT

221

TRACKING-FAILURE PATCH RECOMMENDATION UNIT

223

NEW-OBJECT PATCHES RECOMMENDATION UNIT

INPUT FRAME

FIG. 3

METHOD OF DETECTING OBJECT IN VIDEO AND VIDEO ANALYSIS TERMINAL

CROSS-REFERENCE TO RELATED APPLICATION

This application is based on and claims priority under 35 U.S.C. § 119 to Korean Patent Application No. 10-2022-0054394, filed on May 2, 2022, in the Korean Intellectual Property Office, the disclosure of which is incorporated by reference herein in its entirety.

BACKGROUND

1. Field

The disclosure relates to a method, performed by a mobile terminal, of analyzing a high-definition video in real time.

2. Description of the Related Art

Techniques for detecting an object in a video are used in various video analysis tasks such as face recognition, aid systems for the visually impaired, or drone environment analysis. In a process of detecting an object in a video, a deep learning model is executed for each frame of an input video image. However, there is an issue that it is difficult for a mobile terminal using a processor with limited performance to execute the deep learning model with a large amount of computation for each frame. In order to solve this issue, a detection-based tracking (DBT) method is performed by the mobile terminal. The DBT method is a method of executing a deep learning model for a key frame to obtain an accurate result, and simultaneously executing a tracking model with a small amount of computation for every frame. However, in a case in which the DBT method is performed by a mobile terminal, the delay of a deep learning model may increase upon an input frame with high image quality, and thus, a time period between key frames may increase, resulting in a large accumulation of tracking errors.

SUMMARY

Provided is a method, performed by even a mobile terminal having limited processor performance, of analyzing a high-definition video to detect an object in real time.

Additional aspects will be set forth in part in the description which follows and, in part, will be apparent from the description, or may be learned by practice of the presented embodiments of the disclosure.

According to an aspect of the disclosure, a video analysis terminal includes a patch recommendation unit configured to recommend tracking-failure patches and new-object patches in a current frame of a video image, and a patch aggregation unit configured to generate a first patch cluster by collecting the tracking-failure patches recommended in the current frame, or generate a second patch cluster by collecting the new-object patches, wherein the tracking-failure patches indicate regions for which tracking has failed in the current frame, and the new-object patches indicate regions in which a new object is likely to be present but has not been detected and thus tracking has not been performed.

According to an embodiment, the video analysis terminal further includes a patch object detection unit configured to receive the first patch cluster or the second patch cluster, and detect an object, so as to improve an object detection speed.

According to an embodiment, the first patch cluster or the second patch cluster may have a rectangular shape.

According to an embodiment, the size of the first patch cluster or the second patch cluster may be adjusted according to the size and number of tracking-failure patches or new-object patches included in each of the first patch cluster or the second patch cluster.

According to an embodiment, the patch recommendation unit may be further configured to collect the new-object patches and the tracking-failure patches in every t frame of the video image, before performing object detection.

According to an embodiment, the patch recommendation unit may be further configured to recommend the new-object patches by using an edge intensity and a refresh interval.

According to an embodiment, the patch aggregation unit may be further configured to generate the first patch cluster by classifying and arranging the collected tracking-failure patches according to error values.

According to an embodiment, the tracking-failure patches may be extracted based on features, which are extracted from the current frame and imply a tracking failure, and machine learning for predicting a tracking failure degree based on the extracted features. The extracted features may include normalized cross correlation (NCC) between a bounding box in a frame before tracking and a bounding box after the tracking, a velocity of a bounding box, an acceleration of the bounding box, a gradient of a region around the bounding box, and confidence of detection. In addition, machine learning may be performed by using a decision tree classification model, based on the extracted features, and then a degree of tracking failure is predicted by identifying an intersection over union (IoU), which is a degree of overlap between a tracked bounding box and a real object.

According to another aspect of the disclosure, a method, performed by a terminal, of performing video object detection includes, by a patch recommendation unit, recommending tracking-failure patches and new-object patches in a current frame of a video image, and by a patch aggregation unit, generating a first patch cluster by collecting the tracking-failure patches recommended in the current frame, or generating a second patch cluster by collecting the new-object patches, wherein the tracking-failure patches indicate regions for which tracking has failed in the current frame, and the new-object patches indicate regions in which a new object is likely to be present but has not been detected and thus tracking has not been performed.

According to an embodiment, the method may further include, by a patch object detection unit, receiving the first patch cluster or the second patch cluster, and detecting an object, so as to improve an object detection speed.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates an example of a process, performed by a video analysis terminal, of collecting patches, according to an embodiment;

FIG. 3 illustrates an example of a point in time of extracting patches by a patch recommendation unit, according to an embodiment;

DETAILED DESCRIPTION

Figure 1:
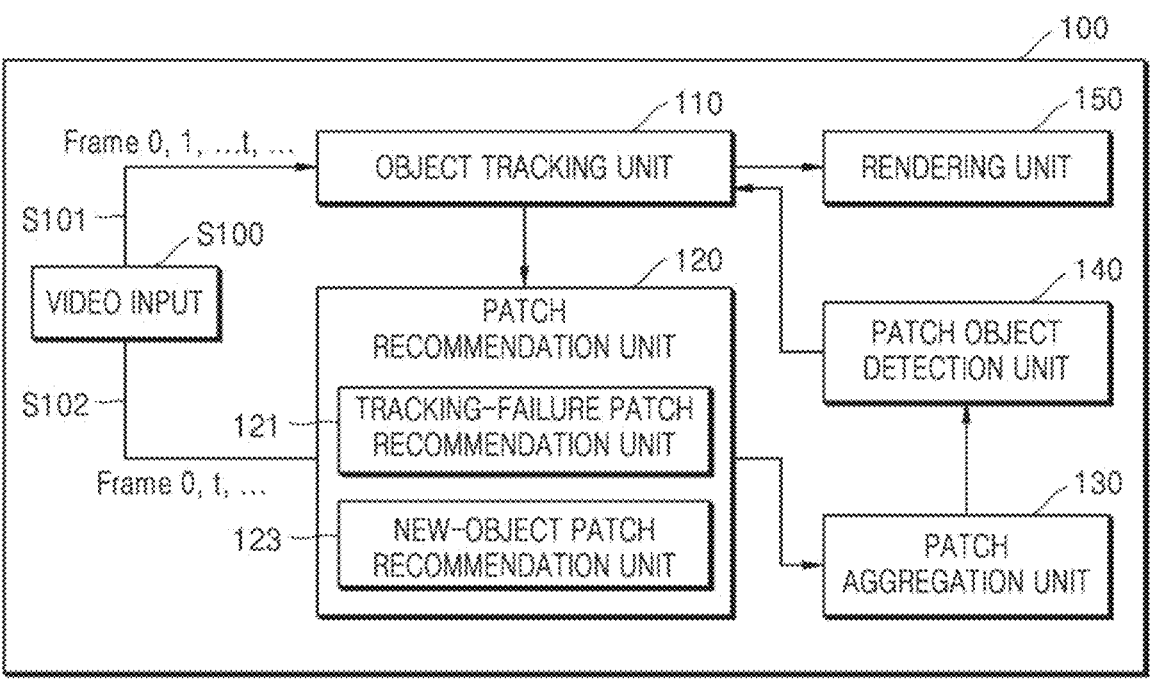
FIG. 1 is an internal configuration diagram of a video analysis terminal according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Hereinafter, embodiments will be described in detail with reference to the accompanying drawings.

FIG. 1 is an internal configuration diagram of a video analysis terminal 100 according to an embodiment. FIG. 2 illustrates an example of a process, performed by the video analysis terminal 100, of collecting patches.

According to an embodiment, the video analysis terminal 100 may reduce a delay of a deep learning model and perform accurate object detection in real time, by generating a first patch cluster by collecting partial regions for which tracking has failed, and generating a second patch cluster by collecting partial regions in which a new object is likely to be present but has not been detected and thus tracking has not been performed, and then detecting an object in the first patch cluster or the second patch cluster.

To this end, the video analysis terminal 100 includes an object tracking unit 110, a patch recommendation unit 120, a patch aggregation unit 130, a patch object detection unit 140, and a rendering unit 150. The patch recommendation unit 120 includes an tracking-failure patch recommendation unit 121 and a new-object patch recommendation unit 123.

The object tracking unit 110 receives each frame of an input video image S100 (S101) and tracks an object, and the rendering unit 150 renders the tracked object by using a technique used in an object tracking method. The rendering unit 150 may display bounding boxes on objects on a screen such that a user may view the positions of the objects.

The patch recommendation unit 120 receives an input of every t frame and object information of the input video image S100. The object information is information about objects detected and tracked by a tracking model used by the object tracking unit 110.

Figure 3:
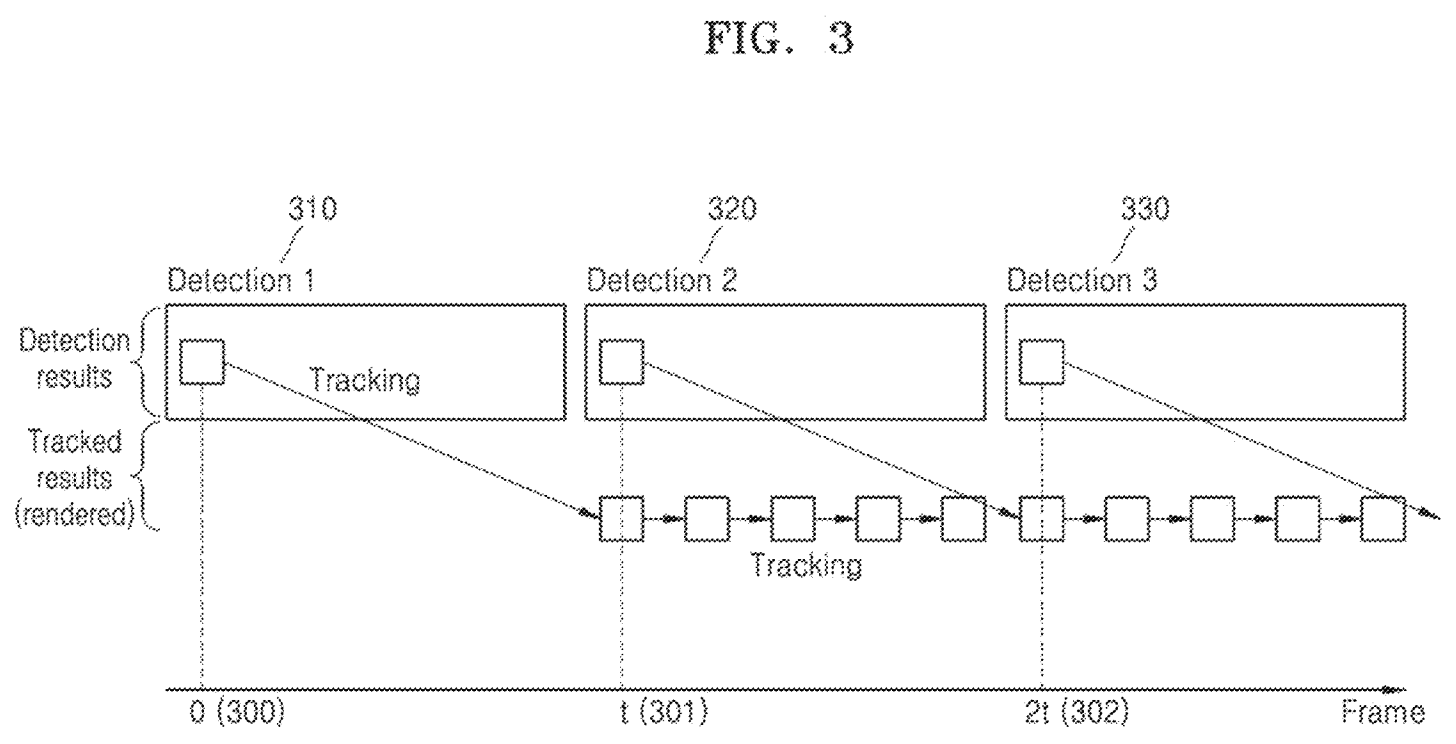

As in the example of FIG. 3, the patch recommendation unit 120 recommends patches for every t frame 310, 320, or 330, such as a first t frame (t) 301, a second t frame (2*t*) 302, and a third frame (3*t*), before performing object detection. In this case, the patches include tracking-failure patches and new-object patches.

According to an embodiment, the new-object patch refers to a region in which a new object is likely to be present in a current frame, but has not been detected by a deep learning model used by a patch object detection unit 240, and thus, tracking has not been performed.

According to an embodiment, the tracking-failure patch refers to a region that has been detected by the deep learning model used by the patch object detection unit 240, but for which tracking by the tracking model used by the object tracking unit 110 has failed in the current frame. The tracking-failure patch refers to a region around previously tracked objects and on which tracking has been actually performed, but a serious tracking error has occurred due to a change in the appearance of the object, occlusion, or the like.

A new-object patch recommendation unit 223 uses an edge intensity and a refresh interval to detect a candidate region in which a new object is likely to be detected. According to an embodiment, the new-object patch recommendation unit 223 may detect, by using the refresh interval in addition to the edge intensity, a region in which an object is present even when an edge intensity value is low. By using the refresh interval, a region that has not been detected due to a low edge intensity value may also be used, after a certain period of time has elapsed, as an input value for object detection.

Figure 4:
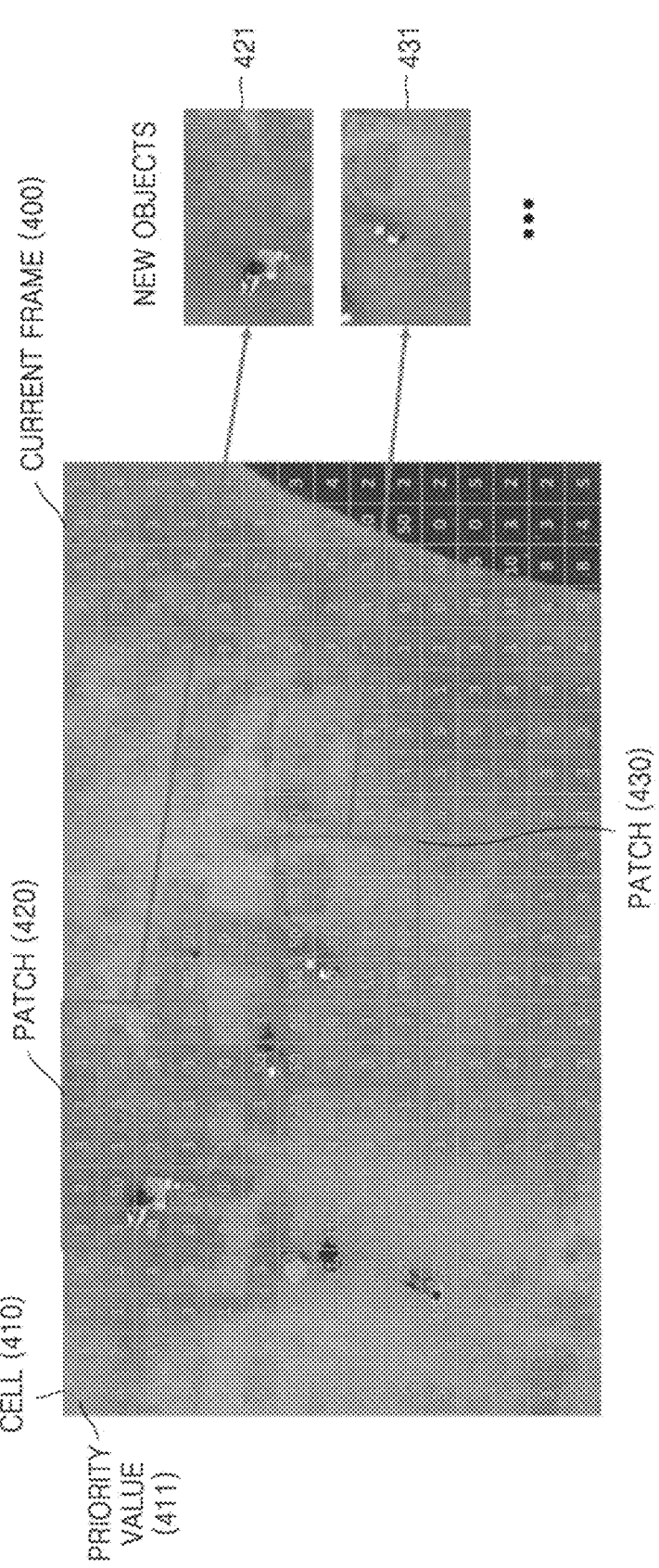
FIG. 4 illustrates an example of calculating a priority value of each cell in a current frame in order to extract new-object patches from the current frame, according to an embodiment.

FIG. 4 illustrates an example of calculating a priority value of each cell in a current frame, in order to extract a new-object patch from the current frame. Descriptions will be provided with reference to FIG. 4.

The new-object patch recommendation unit 123 or 223 divides a current frame 400 into cells 410 each having a size of n\*n, and calculates a priority value 411 for each cell representing the probability of a new object being present in the cell. The priority value is calculated according to Equation 1. In FIG. 4, the current frame 400 is divided into cells each having a size of 8\*8. For the cells in the current frame, the priority values for a region that has been already extracted as an tracking-failure patch are fixed to 0 because it is unnecessary to repeatedly extract the region as a new-object patch, and the priority values of other cells are calculated.

$$\text{Priority}=\text{EI}+W^*\min(T_{RI},\text{RI})$$

In Equation 1, EI denotes an edge intensity, RI denotes a refresh interval, W denotes a weight for adjusting a weight between the edge intensity and the refresh interval, and $T_{RI}$ denotes a preset maximum value of RI for clipping RI to TRI when RI increases to a preset value or greater.

In Equation 1, EI represents how many edges are distributed in a cell. An EI value may be calculated by using an edge detection technique including Canny edge detection.

RI represents how many frames have been passed after a cell was included as an input value for object detection. A cell having a high RI value has not been subject to object detection for a long time, and thus, the priority value of the cell may be increased such that the cell is included in object detection targets.

According to an embodiment, a region including M\*N cells is defined as a patch 420 or 430. M and N are natural numbers and may be determined according to the average size of objects. In addition, M and N may be adjusted in real time according to the sizes of objects detected at runtime. In an embodiment, the patch may have a rectangular shape.

The new-object patch recommendation unit 123 or 223 calculates the sum of the priority values of the respective cells constituting each of all possible patches in the current frame, and then recommends patches, the sums of which are greater than a preset value, as new-object patches. Referring to FIG. 4, the sum of the priority values of the respective cells in the first patch 420 is 189. The sum of the priority values of the respective cells in the second patch 430 is 1049. In a case in which the preset value is set to 100, the first patch 420 and the second patch 430 are recommended as new-object patches 421 and 431, respectively. The new-object patch recommendation unit 123 or 223 recommends new-object patches such that the overlap is less than a certain level in order to prevent several new-object patches from being selected in a particular region in the new-object patches 421 and 431.

The tracking-failure patch recommendation unit 121 or 221 extracts a feature implying a tracking failure, and extracts tracking-failure patches based on machine learning for predicting the degree of tracking failure based on the extracted feature. One example of machine learning is a decision tree classification model.

According to an embodiment, the tracking-failure patch recommendation unit 121 or 221 performs, by using a decision tree classification model, machine learning based on normalized cross correlation (NCC) between a bounding box in a frame before tracking and a bounding box after the tracking, the velocity of a bounding box, an acceleration of the bounding box, a gradient of a region around the bounding box, and confidence of detection, which are features implying a tracking failure, and then predicts the degree of tracking failure by identifying an intersection over union (IoU), which is the degree of overlap between a tracked bounding box and a real object. The bounding box refers to a box shape indicating a region of an object tracked by the object tracking unit 110. According to an embodiment, the decision tree classification model may predict the degree of tracking failure as high, medium, or low. In addition, an error degree of each object may be indicated as high, medium, or low. Referring to FIG. 2, the color of the bounding box of an object may be differently set and displayed according to the degree of error.

The reason of use of each feature is as follows.

NCC: A high NCC indicates a large change in the appearance of the object, and thus implies a tracking failure.

Velocity of bounding box: Tracking generally assumes that the movement of an object between adjacent frames is small and thus searches for the object within a search window, and thus, a high velocity of an object implies a tracking failure.

Acceleration of bounding box: When a bounding box becomes related to another object due to occlusion or the like, the acceleration of the bounding box is indicated to be high, implying a tracking failure.

Gradient of region around bounding box: When a gradient in an image is low, it is easy to fail tracking because the background and an object are not clearly distinguished. For example, in a case in which there is no texture, such as a white wall, tracking is likely to fail.

Confidence of detection: In a case in which the accuracy of detection is poor, the subsequent tracking of the object is also likely to fail.

According to an embodiment, the tracking-failure patch recommendation unit 121 or 221 predicts a degree of tracking failure for each object that has been previously tracked, and determines the sizes of the tracking-failure patches differently according to the value of the predicted degree of tracking failure. For example, in a case in which a tracking error value indicating the degree of tracking failure is low, regions around the previously tracked objects are cropped to a small size. In a case in which the tracking error value is high, the regions around the previously tracked objects are cropped to a large size.

The tracking-failure patch recommendation unit 121 or 221 may set the size of a tracking error of each object that has been previously tracked, and the size of a region obtained by cropping a region around a bounding box, to preset proportions. This is because a high tracking error value means that the bounding box is far from the real object, and thus, a large region around the bounding box needs to be extracted to include the real object in the tracking-failure patch.

The tracking-failure patch indicates a region that has been detected by the deep learning model used by the patch object detection unit 140 or 240, but for which tracking has failed in subsequent frames. The tracking-failure patch refers to a region around previously tracked objects and on which tracking has been actually performed, but a serious tracking error has occurred due to a change in the appearance of the object, occlusion, or the like.

Returning to FIG. 1, according to an embodiment, the patch aggregation unit 130 generates a first patch cluster by collecting tracking-failure patches, or generates a second patch cluster by collecting new-object patches. According to another embodiment, the patch aggregation unit 130 may generate only the first patch cluster. Also, the patch aggregation unit 130 may generate only the second patch cluster. Also, the patch aggregation unit 130 may generate both the first patch cluster and the second patch cluster.

Referring to FIG. 2, a patch aggregation unit 230 includes an tracking-failure patch aggregation unit 231 and a new-object patch aggregation unit 233.

The tracking-failure patch aggregation unit 231 generates the first patch cluster in a rectangular shape by collecting rectangular tracking-failure patches recommended in the current frame by the patch recommendation unit 120. The tracking-failure patch aggregation unit 231 classifies and arranges the collected tracking-failure patches according to error values. The error value may be set to high, medium, or low. The tracking-failure patch aggregation unit 231 preferentially arranges tracking-failure patches with error values set to high, and then arranges tracking-failure patches with error values set to medium. Then, the tracking-failure patch aggregation unit 231 arranges tracking-failure patches with error values set to low. In a case in which there are few or no existing objects being tracked in the current frame and thus there are few tracking-failure patches, the tracking-failure patch aggregation unit 231 may fill the remaining space of the first patch cluster with new-object patches.

The new-object patch aggregation unit 233 generates the second patch cluster in a rectangular shape by collecting rectangular new-object patches recommended in the current frame by the patch recommendation unit 120.

According to an embodiment, it should be noted that the patch aggregation unit 130 may use the Guillotine algorithm or other algorithms to fill the patch cluster without any gaps. The size of the first patch cluster or the second patch cluster may be dynamically adjusted according to the size and number of tracking-failure patches or new-object patches included in the first patch cluster or the second patch cluster.

The patch object detection unit 140 or 240 perform object detection on the first patch cluster or the second patch cluster provided by the patch aggregation unit 130, thereby improving the object detection speed compared to a case in which objects are individually detected. The patch object detection unit 140 or 240 may receive an input of only the first patch cluster or an input of only the second patch cluster, or may alternately receive inputs of two patch clusters, from the patch aggregation unit 130. The ratio between the two patch clusters to be received may be adjusted. For example, when there is no existing object currently being tracked, the first patch cluster of tracking-failure patches does not present, and thus, only the second patch cluster is generated.

The patch object detection unit 140 or 240 provide the object tracking unit 110 with objects detected in the first patch cluster or the second patch cluster.

Figure 5:
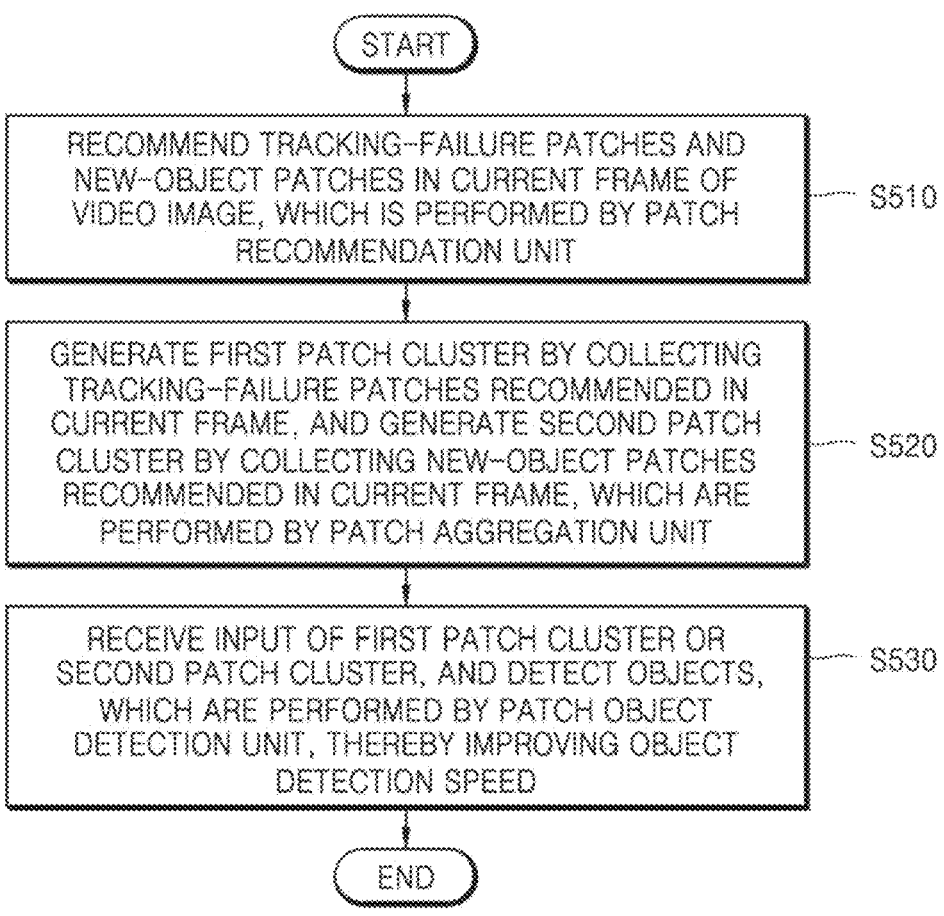
FIG. 5 is a flowchart of a method, performed by a terminal, of performing video object detection, according to an embodiment.

FIG. 5 is a flowchart of a method, performed by a terminal, of performing video object detection, according to an embodiment. The terminal of FIG. 5 includes a device implemented with a processor having limited resources, such as a mobile phone, a smart phone, or a mobile watch.

A patch recommendation unit recommends tracking-failure patches and new-object patches in a current frame of a video image (S510). A patch aggregation unit generates a first patch cluster by collecting the tracking-failure patches recommended in the current frame, and generates a second patch cluster by collecting the new-object patches recommended in the current frame (S520). Then, a patch object detection unit receives, from the patch aggregation unit, an input of the first patch cluster or the second patch cluster, and detects objects, thereby improving the object detection speed (S530).

The method according to an embodiment described above may be embodied as program commands executable by various computer devices, and recorded on a computer-readable medium. The computer-readable medium may include program instructions, data files, data structures, or the like separately or in combinations. The program commands to be recorded on the medium may be specially designed and configured for an embodiment, or may be well-known to and be usable by those skill in the art of computer software. Examples of the computer-readable recording medium include magnetic media such as hard disks, floppy disks, or magnetic tapes, optical media such as compact disc read-only memories (ROM) (CD-ROMs) or digital video discs (DVDs), magneto-optical media such as floptical disks, and hardware devices such as ROM, random-access memory (RAM), and flash memory, which are specially configured to store and execute program instructions.

Although the embodiments have been described with the limited embodiments and the drawings, various modifications and changes may be made by those of skill in the art from the above description. For example, the described techniques may be performed in a different order from the described method, and/or components of the described system, structure, device, circuit, etc. may be combined or integrated in a different form from the described method, or may be replaced or substituted by other components or equivalents to achieve appropriate results. Therefore, other implementations or embodiments, and equivalents of the following claims are within the scope of the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A video analysis terminal comprising:

at least one processor, and memory storing instructions, wherein the instructions, when executed by the at least one processor, cause the video analysis terminal to:

recommend tracking-failure patches and new-object patches in a current frame of a video image; and generate a first patch cluster by collecting the tracking-failure patches recommended in the current frame, or generate a second patch cluster by collecting the new-object patches recommended in the current frame, wherein the tracking-failure patches indicate regions for which tracking has failed in the current frame, wherein the new-object patches indicate regions in which a new object is likely to be present but has not been detected and thus tracking has not been performed, wherein the tracking-failure patches are extracted based on features, which are extracted from the current frame and imply a tracking failure, and machine learning for predicting a tracking failure degree based on the extracted features, and wherein the extracted features comprise normalized cross correlation (NCC) between a bounding box in a frame before tracking and a bounding box after the tracking, a velocity of a bounding box, an acceleration of the bounding box, a gradient of a region around the bounding box, and confidence of detection.

2. The video analysis terminal of claim 1, wherein the instructions, when executed by the at least one processor, cause the vide analysis terminal to receive the first patch cluster or the second patch cluster, and detect an object, so as to improve an object detection speed.

3. The video analysis terminal of claim 1, wherein the first patch cluster or the second patch cluster has a rectangular shape.

4. The video analysis terminal of claim 1, wherein a size of the first patch cluster or the second patch cluster is adjusted according to a size and number of tracking-failure patches or new-object patches included in each of the first patch cluster or the second patch cluster.

5. The video analysis terminal of claim 1, wherein the instructions, when executed by the at least one processor, cause the video analysis terminal to collect the new-object patches and the tracking-failure patches in every t frame of the video image, before performing object detection.

6. The video analysis terminal of claim 1, wherein the instructions, when executed by the at least one processor, cause the video analysis terminal to recommend the new-object patches by using an edge intensity and a refresh interval.

7. The video analysis terminal of claim 1, wherein the instructions, when executed by the at least one processor, cause the video analysis terminal to generate the first patch cluster by classifying and arranging the collected tracking-failure patches according to error values.

8. The video analysis terminal of claim 1, wherein machine learning is performed by using a decision tree classification model, based on the extracted features, and then a degree of tracking failure is predicted by identifying an intersection over union (IoU), which is a degree of overlap between a tracked bounding box and a real object.

9. A method, performed by a terminal, of performing video object detection, the method comprising:

recommending tracking-failure patches and new-object patches in a current frame of a video image; and generating a first patch cluster by collecting the tracking-failure patches recommended in the current frame, or generating a second patch cluster by collecting the new-object patches recommended in the current frame, wherein the tracking-failure patches indicate regions for which tracking has failed in the current frame, and wherein the new-object patches indicate regions in which a new object is likely to be present but has not been detected and thus tracking has not been performed, wherein the tracking-failure patches are extracted based on features, which are extracted from the current frame and imply a tracking failure, and machine learning for predicting a tracking failure degree extracted features, and wherein the extracted features comprise normalized cross correlation (NCC) between a bounding box in a frame before tracking and a bounding box after the tracking, velocity of a bounding box, an acceleration of the bounding box, a gradient of a region around the bounding box, and confidence of detection.

10. The method of claim 9, further comprising receiving the first patch cluster or the second patch cluster, and detecting an object, so as to improve an object detection speed.

11. The method of claim 9, wherein a size of the first patch cluster or the second patch cluster is adjusted according to a size and number of tracking-failure patches or new-object patches included in each of the first patch cluster or the second patch cluster.

12. The method of claim 9, wherein the recommending comprises recommending the new-object patches by using an edge intensity and a refresh interval.

13. The method of claim 9, wherein the recommending comprises recommending the tracking-failure patches based on features, which are extracted from the current frame and imply a tracking failure, and machine learning for predicting a tracking failure degree based on the extracted features.

14. A computer program stored in a non-transitory computer-readable recording medium, for executing, on the terminal, the method of performing the video object detection of claim 9.

* * * * *